(12) United States Patent
Kim et al.

(10) Patent No.: US 11,139,687 B2
(45) Date of Patent: Oct. 5, 2021

(54) ELECTRONIC DEVICE AND WIRELESS POWER TRANSMISSION AND RECEPTION CONTROL METHOD OF ELECTRONIC DEVICE

(71) Applicant: Samsung Electronics Co., Ltd., Suwon-si (KR)

(72) Inventors: Yongyoun Kim, Anyang-si (KR); Yongsang Yun, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 16/069,648

(22) PCT Filed: Nov. 16, 2016

(86) PCT No.: PCT/KR2016/013173
§ 371 (c)(1),
(2) Date: Jul. 12, 2018

(87) PCT Pub. No.: WO2017/135554
PCT Pub. Date: Aug. 10, 2017

(65) Prior Publication Data
US 2019/0025891 A1  Jan. 24, 2019

(30) Foreign Application Priority Data

Feb. 2, 2016 (KR) .......................... 10-2016-0012796

(51) Int. Cl.
*H02J 50/10* (2016.01)
*H02J 50/12* (2016.01)
(Continued)

(52) U.S. Cl.
CPC ............ *H02J 50/10* (2016.02); *G06F 1/1635* (2013.01); *G06F 1/1683* (2013.01); *G06F 1/266* (2013.01);
(Continued)

(58) Field of Classification Search
CPC .............................. G06F 1/1683; H02J 50/10
(Continued)

(56) References Cited

U.S. PATENT DOCUMENTS 6,538,909 B2    3/2003  Goodarzi et al.
2009/0230777 A1*  9/2009  Baarman ................. H02J 50/10
307/104
(Continued)

FOREIGN PATENT DOCUMENTS

JP    2011-142559 A    7/2011
JP    2014-128068 A    7/2014
(Continued)

*Primary Examiner* — Jerry D Robbins
(74) *Attorney, Agent, or Firm* — Jefferson IP Law, LLP

(57) ABSTRACT

An electronic device according to various embodiments of the present invention comprises: a housing including a first surface; a coil located close to the first surface within the housing and having conductivity; a battery located within the housing and being rechargeable; a first circuit located within the housing and providing, via the coil, power received wirelessly from the outside of the housing to a power management circuit; a second circuit located within the housing and providing wirelessly, via the coil, power of the battery to the outside of the housing; and a third circuit configured to establish selectively a first electrical connection between the first circuit and a first feed point of the coil or a second electrical connection between the second circuit and a second feed point of the coil, wherein the first feed point and the second feed point may be different. Other various embodiments are possible.

15 Claims, 9 Drawing Sheets

(51) Int. Cl.
  *H04M 1/02*  (2006.01)
  *H04B 5/00*  (2006.01)
  *G06F 1/26*  (2006.01)
  *H02J 7/34*  (2006.01)
  *G06F 1/16*  (2006.01)
  *H02J 7/02*  (2016.01)

(52) U.S. Cl.
  CPC .............. *H02J 7/025* (2013.01); *H02J 7/342* (2020.01); *H02J 50/12* (2016.02); *H04B 5/0037* (2013.01); *H04B 5/0075* (2013.01); *H04M 1/02* (2013.01); *H04M 1/026* (2013.01); *Y02B 40/00* (2013.01)

(58) Field of Classification Search
  USPC ........................................................ 320/108
  See application file for complete search history.

(56) References Cited

U.S. PATENT DOCUMENTS

| | | | |
|---|---|---|---|
| 2009/0289862 A1* | 11/2009 | Seppa | H01Q 23/00 343/745 |
| 2011/0169337 A1* | 7/2011 | Kozakai | H02J 50/12 307/104 |
| 2012/0154226 A1* | 6/2012 | Kim | H01Q 5/35 343/702 |
| 2012/0242164 A1* | 9/2012 | Teggatz | H01F 38/14 307/104 |
| 2013/0017781 A1* | 1/2013 | Jones | H01Q 1/243 455/41.1 |
| 2014/0210407 A1* | 7/2014 | Won | H02J 50/40 320/108 |
| 2015/0180284 A1 | 6/2015 | Kang et al. | |
| 2015/0194839 A1* | 7/2015 | Wojcik | H01M 10/46 320/108 |
| 2016/0094076 A1* | 3/2016 | Kasar | H04M 1/7253 320/103 |
| 2017/0040693 A1* | 2/2017 | Luzinski | H02J 7/025 |

FOREIGN PATENT DOCUMENTS

| | | |
|---|---|---|
| KR | 10-1213027 B1 | 9/2012 |
| KR | 10-2013-0032293 A | 4/2013 |
| KR | 10-2015-0073275 A | 7/2015 |
| KR | 10-2015-0077678 A | 7/2015 |

* cited by examiner

ELECTRONIC DEVICE AND WIRELESS POWER TRANSMISSION AND RECEPTION CONTROL METHOD OF ELECTRONIC DEVICE

TECHNICAL FIELD

The disclosure relates to an electronic device and, for example, to an electronic device capable of charging a power source wirelessly and transmitting power to an external device.

BACKGROUND ART

Portable electronic devices (hereinafter, referred to as "electronic devices"), such as smart phones, tablet PCs, or the like, may supply power through rechargeable batteries. Batteries adopted in electronic devices must be charged periodically due to capacity limitations thereof, and an external power supply may come into electric contact with the electronic device, thereby charging the battery of the electronic device.

With the development of technology, in recent years, various wireless charging technologies have been developed and commercialized in order to wirelessly charge the battery using electromagnetic waves, magnetic induction, or magnetic resonance without physical contact between an electronic device and a charging device. The wireless charging technologies are being internationally standardized by WPC (Wireless Power Consortium) or the like.

In addition to the wireless charging technology, techniques for transmitting battery power of an electronic device to other electronic devices in a peer-to-peer (or device-to-device) manner, based on wireless charging technologies, are also being developed.

DISCLOSURE OF INVENTION

Technical Problem

The most important factor indicating the performance of wireless power transmission may be efficiency. Charging and transmission circuits must be configured in the electronic device in order to provide wireless charging and wireless power transmission functions. Various factors (e.g., impedance, resonance frequency, quality index, or the like), which may affect the efficiency, may vary in a wireless charging mode and in a wireless power transmission mode, and may also vary depending on various problems, such as the distance between an electronic device and an external device, resulting from the usage thereof.

When an electronic device uses only a single coil antenna for wireless charging and wireless power transmission, the inductance value of the coil has to be fixed to the same value. Accordingly, it may be impossible to realize the above factors that ensure optimal efficiency in wireless charging and wireless power transmission.

In addition, in the case where an electronic device adopts separate coils for wireless charging and wireless power transmission, respectively, it is not suitable for miniaturization of the electronic device because two coils must be provided within a limited area.

Solution to Problem

An electronic device according to various embodiments of the disclosure may include: a housing having a first surface; a conductive coil located close to the first surface inside the housing; a rechargeable battery located inside the housing; a first circuit located inside the housing and providing a power management circuit with power wirelessly received from the outside of the housing through the coil; a second circuit located inside the housing and wirelessly providing power of the battery to the outside of the housing through the coil; and a third circuit configured to selectively establish a first electrical connection between the first circuit and a first feeding point of the coil or a second electrical connection between the second circuit and a second feeding point of the coil, wherein the first feeding point and the second feeding point may be different.

An electronic device according to various embodiments of the disclosure may include: a coil disposed inside the electronic device and including two or more signal connection points; a first circuit configured to wirelessly transmit power to an external electronic device through the coil; a second circuit configured to receive power from an external electronic device through the coil; a control circuit; and a memory electrically connected to the control circuit, wherein the memory may include instructions that, when executed, allow the control circuit to recognize a power mode state of the electronic device and to control the signal connection points of the coil depending on the power mode state.

A wireless power transmission and reception control method of an electronic device including a coil for receiving or transmitting power according to various embodiments of the disclosure may include: recognizing a power mode state of the electronic device; establishing a first electrical connection between a first circuit for receiving wireless power from an external electronic device and a first feeding point of the coil when the power mode state is in a reception mode; and establishing a second electrical connection between a second circuit for transmitting wireless power to an external electronic device and a second feeding point of the coil when the power mode state is in a transmission mode.

Advantageous Effects of Invention

According to various embodiments of the disclosure described above, it is possible to provide an electronic device having optimal wireless charging efficiency by changing the inductance value of the coil when the wireless charging mode is a reception mode or a transmission mode, and to provide a wireless power transmission and reception control method thereof.

BEST MODE FOR CARRYING OUT THE INVENTION

Figure 1:
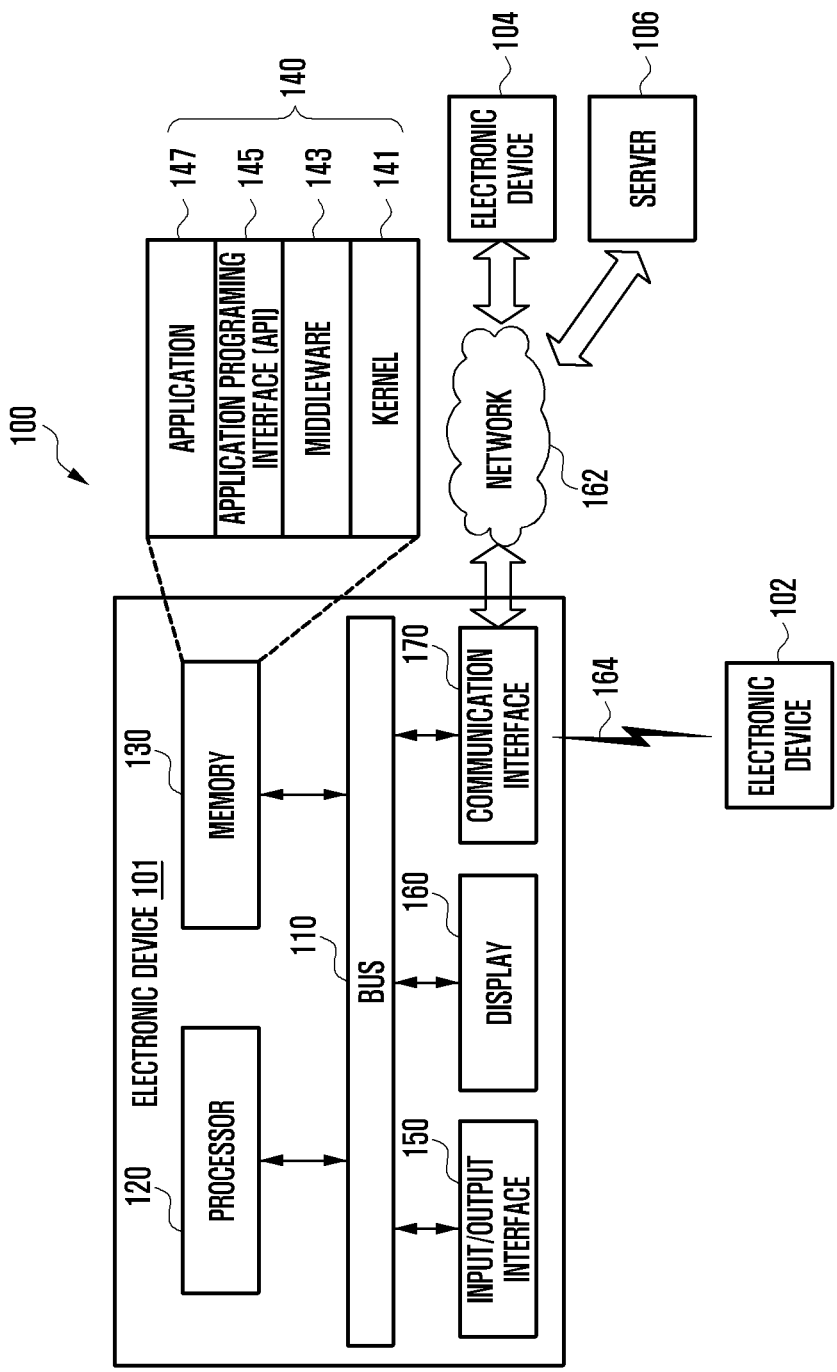
FIG. 1 illustrates an electronic device in a network environment according to various embodiments.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

Referring to FIG. 1, an electronic device 101 in a network environment 100 is disclosed in various embodiments. The electronic device 101 may include a bus 110, a processor 120, a memory 130, an input/output interface 150, a display 160, and a communication interface 170. In some embodiments, the electronic device 101 may exclude at least one of the above elements, or may further include other elements in addition thereto. The bus 110 may include a circuit for connecting the elements 110 to 170 with each other and for transferring communication data (e.g., control messages and/or data) between the elements. The processor 120 may include at least one of a central processing unit, an application processor, or a communication processor (CP). The processor 120, for example, may perform a calculation or data processing in relation to control and/or communication of one or more other elements of the electronic device 101.

The memory 130 may include a volatile and/or non-volatile memory. For example, the memory 130 may store commands or data in relation to one or more other elements of the electronic device 101. According to an embodiment, the memory 130 may store software and/or programs 140. For example, the programs 140 may include a kernel 141, middleware 143, an application programming interface (API) 145, and/or application programs (or "applications") 147. At least some of the kernel 141, the middleware 143, or the API 145 may be referred to as an "operating system." The kernel 141, for example, may control or manage system resources (e.g., the bus 110, the processor 120, the memory 130, or the like), which are used to execute operations or functions that are implemented in other programs (e.g., the middleware 143, the API 145, or the application programs 147). In addition, the kernel 141 may provide an interface by which the middleware 143, the API 145, or the application programs 147 may access respective elements of the electronic device 101, thereby controlling or managing system resources.

The middleware 143, for example, may play an intermediate role between the API 145 or the application programs 147 and the kernel 141, thereby allowing the same to communicate with each other for transmission and reception of data. The middleware 143 may process one or more operation requests received from the application programs 147 according to priority. For example, the middleware 143 may give priority for using the system resources (e.g., the bus 110, the processor 120, the memory 130, or the like) of the electronic device 101 to at least one of the application programs 147, and may process the one or more operation requests. The API 145, which is an interface by which the applications 147 control functions provided by the kernel 141 or the middleware 143, for example, may include one or more interfaces or functions (e.g., instructions) for file control, window control, image processing, text control, or the like. The input/output interface 150, for example, may transfer commands or data received from a user or other external devices to other elements of the electronic device 101, or may output commands or data received from the other elements of the electronic device 101 to the user or other external devices.

The display 160, for example, may include a liquid crystal display (LCD), a light-emitting diode (LED) display, an organic light-emitting diode (OLED) display, a microelectromechanical systems (MEMS) display, or an electronic paper display. For example, the display 160 may display a variety of content (e.g., text, images, videos, icons, symbols, or the like) to the user. The display 160 may include a touch screen, and may receive, for example, touch input, gesture input, proximity input, or hovering input using electronic pens or a user's body part. The communication interface 170, for example, may establish communication between the electronic device 101 and external devices (e.g., a first external electronic device 102, a second external electronic device 104, or a server 106). For example, the communication interface 170 may be connected to the network 162 through wireless communication or wired communication, thereby communicating with external devices (e.g., the second external electronic device 104 or the server 106).

For example, the wireless communication may include a cellular communication that uses at least one of LTE, LTE-A (LTE Advance), CDMA (Code Division Multiple Access), WCDMA (Wideband CDMA), a UMTS (Universal Mobile Telecommunications System), WiBro (Wireless Broadband), a GSM (Global System for Mobile Communications), or the like. According to an embodiment, the wireless communication, for example, may include at least one of Wi-Fi (Wireless Fidelity), Bluetooth, Bluetooth Low-Energy (BLE), ZigBee, NFC (Near Field Communication), magnetic secure transmission, radio frequency (RF), or a Body Area Network (BAN). According to an embodiment, the wireless communication may include a GNSS. The GNSS, for example, may be a GPS (Global Positioning System), a GLONASS (Global Navigation Satellite System), the BeiDou Navigation Satellite System (hereinafter, "BeiDou"), Galileo, or the European global satellite-based navigation system. Hereinafter, "GPS" may be used interchangeably with "GNSS" in the present specification. For example, the wired communication may include at least one of a USB (Universal Serial Bus), an HDMI (High-Definition Multimedia Interface), RS-232 (Recommended Standard 232), or a POTS (Plain Old Telephone Service). The network 162 may include at least one of the telecommunication networks, such as a computer network (e.g., LAN or WAN), the Internet, or a telephone network.

The first and second external electronic devices 102 and 104 may be the same as, or different from, the electronic device 101 as to the type thereof. According to various embodiments, at least some or all of the operations that are executed in the electronic device 101 may be executed by one or more other electronic devices (e.g., the electronic device 102 or 104, or the server 106). According to an embodiment, in the case where the electronic device 101 executes specific functions or services automatically or upon request, the electronic device 101 may make a request to other devices (e.g., the electronic device 102 or 104, or the server 106) for at least some of the functions related to the same, instead of executing the functions or services by itself, or in addition thereto. Other electronic devices (e.g., the electronic device 102 or 104, or the server 106) may execute the requested functions or additional functions, and may transfer the results thereof to the electronic device 101. The electronic device 101 may provide the requested functions or services by providing the received results without further processing or by additionally processing the same. To this end, for example, cloud computing, distributed computing, or client-server computing technology may be used.

Figure 2:
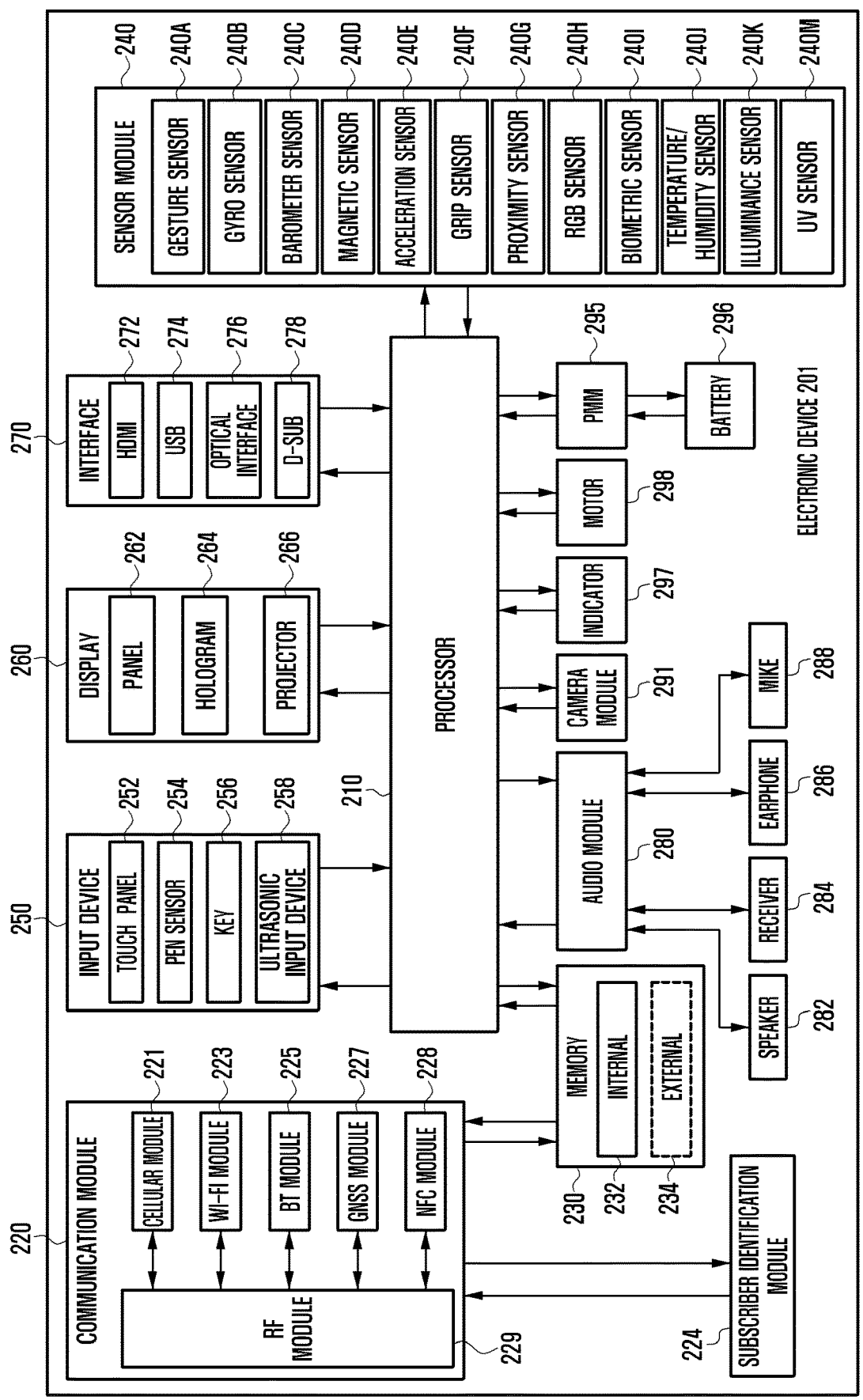
FIG. 2 is a block diagram of an electronic device according to various embodiments.

FIG. 2 is a block diagram of an electronic device according to various embodiments. An electronic device 201, for example, may include all or some of the elements of the electronic device 101 shown in FIG. 1. The electronic device 201 may include one or more processors (e.g., AP) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210, for example, may control a multitude of hardware or software elements connected with the processor 210, and may perform processing of a variety of data and a calculation by executing an operating system or application programs. The processor 210 may be implemented by, for example, a system on chip (SoC). According to an embodiment, the processor 210 may further include a graphic processing unit (GPU) and/or an image signal processor. The processor 210 may include at least some (e.g., the cellular module 221) of the elements shown in FIG. 2. The processor 210 may load commands or data received from one or more other elements (e.g., a non-volatile memory) to a volatile memory to then process the same, and may store result data in a non-volatile memory.

The communication module 220 may have a configuration the same as or similar to that of the communication interface 170. The communication module 220, for example, may include a cellular module 221, a Wi-Fi module 223, a Bluetooth module 225, a GNSS module 227, an NFC module 228, and an RF module 229. The cellular module 221, for example, may provide services of voice calls, video calls, text messaging, or the Internet through communication networks. According to an embodiment, the cellular module 221 may perform identification and verification of the electronic device 201 in communication networks using the subscriber identification module (e.g., a SIM card) 224. According to an embodiment, the cellular module 221 may perform at least some of the functions provided by the processor 210. According to an embodiment, the cellular module 221 may include a communication processor (CP). According to some embodiments, at least some (e.g., two or more) of the cellular module 221, the Wi-Fi module 223, the Bluetooth module 225, the GNSS module 227, or the NFC module 228 may be included in a single integrated chip (IC) or IC package. The RF module 229, for example, may transmit and receive communication signals (e.g., RF signals). The RF module 229 may include, for example, a transceiver, a power amp module (PAM), a frequency filter, a low-noise amplifier (LNA), antennas, or the like. According to another embodiment, at least one of the cellular module 221, the Wi-Fi module 223, the Bluetooth module 225, the GNSS module 227, or the NFC module 228 may transmit and receive RF signals through a separate RF module. The subscriber identification module 224, for example, may include a card including a subscriber identification module or an embedded SIM, and may contain inherent identification information {e.g., an integrated circuit card identifier (ICCID)} or subscriber information {e.g., an international mobile subscriber identity (IMSI)}.

The memory 230 (e.g., the memory 130), for example, may include an internal memory 232 or an external memory 234. The internal memory 232, for example, may include at least one of volatile memories (e.g., a DRAM, an SRAM, an SDRAM, or the like} or non-volatile memories {e.g., an one-time programmable ROM (OTPROM), a PROM, an EPROM, an EEPROM, a mask ROM, a flash ROM, a flash memory, a hard drive, a solid state drive (SSD), or the like}. The external memory 234 may include a flash drive, and may include, for example, compact flash (CF), secure digital (SD), Micro-SD, Mini-SD, extreme digital (xD), a multi-media card (MMC), a memory stick, or the like. The external memory 234 may be functionally and/or physically connected with the electronic device 201 through any of various interfaces.

The sensor module 240, for example, may measure physical quantities or may detect the operation state of the electronic device 201, thereby converting the measured or detected information to electrical signals. The sensor module 240 may include at least one of, for example, a gesture sensor 240A, a gyro-sensor 240B, an atmospheric pressure sensor 240C, a magnetic sensor 240D, an acceleration sensor 240E, a grip sensor 240F, a proximity sensor 240G, a color sensor 240H {e.g., a red-green-blue (RGB) sensor}, a biometric sensor 240I, a temperature/humidity sensor 240J, an illuminance sensor 240K, or an ultra-violet (UV) sensor 240M. Additionally or alternatively, the sensor module 240, for example, may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor as a part of the processor 210 or separately from the processor 210, which is configured to control the sensor module 240, thereby controlling the sensor module 240 while the processor 210 is in a sleep mode.

The input device 250, for example, may include a touch panel 252, a (digital) pen sensor 254, keys 256, or an ultrasonic input device 258. The touch panel 252 may be at least one of, for example, a capacitive type, a pressure-sensitive type, an infrared type, or an ultrasonic type. In addition, the touch panel 252 may further include a control circuit. The touch panel 252 may further include a tactile layer, thereby providing a user with a tactile reaction. The (digital) pen sensor 254, for example, may be a part of the touch panel, or may include a separate recognition sheet. The keys 256 may include, for example, physical buttons, optical keys, or a keypad. The ultrasonic input device 258 may detect ultrasonic waves generated by the input means through a microphone (e.g., a microphone 288), thereby identifying data corresponding to the detected ultrasonic waves.

The display 260 (e.g., the display 160) may include a panel 262, a hologram device 264, a projector 266, and/or a control circuit to control the same. The panel 262 may be implemented to be, for example, flexible, transparent, or wearable. The panel 262 may be configured with the touch panel 252 as at least one module. According to an embodiment, the panel 262 may include a pressure sensor (or a force sensor) for measuring the intensity of pressure with respect to a user's touch. The pressure sensor may be implemented with the touch panel 252 in an integral form, or may be implemented as one or more sensors separated from the touch panel 252. The hologram device 264 may display 3D images in the air using light interference. The projector 266 may display images by projecting light onto a screen. The screen may be provided, for example, inside or outside the electronic device 201. The interface 270 may include, for example, an HDMI 272, a USB 274, an optical interface 276, or a D-subminiature (D-sub) 278. The interface 270 may be included in, for example, the communication interface 170 shown in FIG. 1. Additionally or alternatively, the interface 270 may include, for example, a mobile high-definition link (MHL) interface, a SD card/multi-media card (MMC) interface, or an infrared data association (IrDA) standard interface.

The audio module 280, for example, may convert a sound into an electrical signal, and vice versa. At least some elements of the audio module 280 may be included, for example, in the input/output interface 145 shown in FIG. 1. For example, the audio module 280 may process voice information that is input or output through a speaker 282, a receiver 284, earphones 286, or a microphone 288. The camera module 291, for example, may be a device for photographing still and moving images, and, according to an embodiment, the camera module 291 may include one or more image sensors (e.g., a front sensor or a rear sensor), lenses, an image signal processor (ISP), or a flash (e.g., an LED or a xenon lamp). The power management module 295, for example, may manage power of the electronic device 201. According to an embodiment, the power management module 295 may include a power management integrated circuit (PMIC), a charging integrated circuit (IC), or a battery or fuel gauge. The PMIC may be implemented by a wired charging type and/or a wireless charging type. The wireless charging type may encompass, for example, a magnetic resonance type, a magnetic induction type, or an electromagnetic wave type, and additional circuits for wireless charging, such as coil loops, resonance circuits, or rectifiers, may be further included. The battery gauge may measure, for example, the remaining power of the battery 296, a charging voltage, current, or temperature. The battery 296 may include, for example, a rechargeable battery and/or a solar battery.

The indicator 297 may display a specific state (e.g., a booting state, a message state, or a charging state) of the whole or a part (e.g., the processor 210) of the electronic device 201. The motor 298 may convert an electrical signal to a mechanical vibration, and may provide a vibration or a haptic effect. The electronic device 201 may include a mobile-TV supporting device (e.g., a GPU) for processing media data according to standards, such as, for example, digital multimedia broadcasting (DMB), digital video broadcasting (DVB), or mediaFlo™. The respective elements described in the present specification may include one or more components, and the names of the elements may vary depending on the type of electronic device. According to various embodiments, the electronic device (e.g., the electronic device 201) may be configured by excluding some of the elements or by further including other elements. Alternatively, some of the elements of the electronic device may be combined to constitute a single entity, thereby performing the same function as that of the elements before being combined.

Hereinafter, various embodiments of the disclosure in which an electronic device controls internal circuits in respective wireless power mode states will be described.

An electronic device according to various embodiments of the disclosure may perform a wireless charging function. Various methods, such as a magnetic induction method or a magnetic resonance method, may be applied to wireless charging. In the case of the magnetic induction method, transmission power is transferred as reception power using an electromagnetic induction phenomenon between a coil provided in an electronic device and a coil provided in an external device, which has been standardized by the Wireless Power Consortium (WPC). The magnetic resonance method uses a resonance phenomenon between a transmission coil and a reception coil, which have the same resonance frequency, and the standardization thereof is in progress in A4WP (Alliance for Wireless Power), PMA (Power Matters Alliance), Airfuel-Alliance, and the like. Hereinafter, the description will be made of an embodiment in which the electronic device receives or transmits wireless power by a magnetic induction method. However, various embodiments of the disclosure can be applied to the case where the electronic device uses a wireless charging method of magnetic resonance, for example, by changing the inductance of a coil of the electronic device and by switching the electrical connection between the circuits.

An electronic device according to various embodiments may transmit the power charged in the battery of the electronic device to another electronic device. Hereinafter, the state in which an electronic device receives power from an external device (e.g., an external charging device or another electronic device) so as to charge a battery of the electronic device will be referred to as a "reception mode", and the state in which an electronic device 715 supplies power to an external device (e.g., another electronic device) so as to charge the same will be referred to as a "transmission mode", wherein the reception mode and the transmission mode will be referred to as "power mode states."

Figure 3:
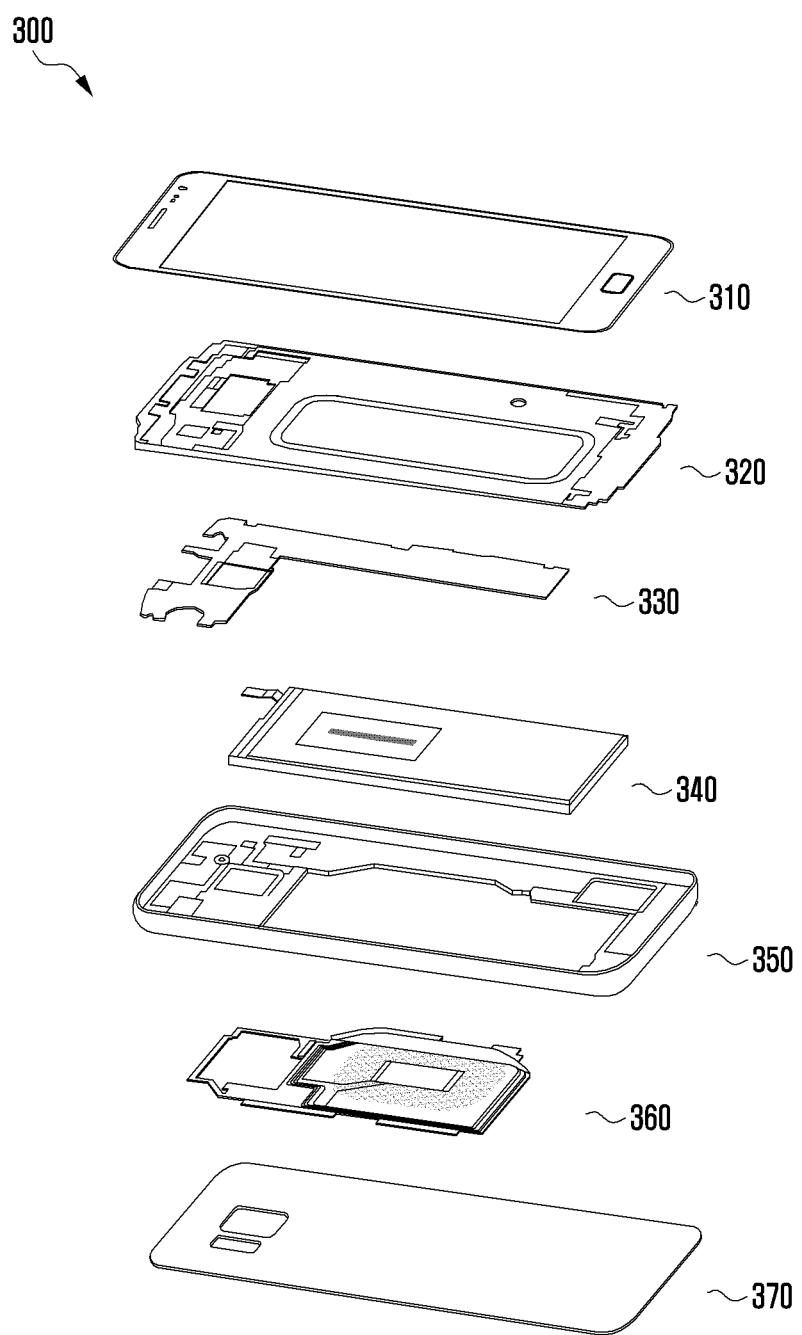
FIG. 3 illustrates a stacked structure of an electronic device according to various embodiments of the disclosure.

FIG. 3 illustrates a stacked structure of an electronic device in accordance with various embodiments of the disclosure.

As shown in the drawing, the electronic device may include an external front housing 310, an internal front housing 320, a printed circuit board (PCB) 330, a battery 340, an internal back housing 350, a coil antenna 360, and an external back housing 370, which may be stacked and assembled in the order as shown in the drawing.

The external front housing 310 and the external back housing 370 may be coupled such that the front surface and the back surface thereof are exposed to the outside, respectively, while other components are accommodated therebetween. The internal front housing 320 and the internal back housing 350 may be disposed between the external front housing 310 and the external back housing 370, and at least a portion thereof may be exposed to the outside when the electronic device is assembled.

A display may be coupled to a portion of the external front housing 310.

The internal front housing 320 and the internal back housing 350 may be made of one or more non-conductive materials so as not to interrupt electrical signal flows between various circuits on the PCB 330.

The PCB 330 may be provided such that various processors and memories can be mounted thereon, and may be fixed so as to be supported between the internal front housing 320 and the internal back housing 350.

The battery 340 may be an existing rechargeable battery 340, and may be embedded in the electronic device, or may be configured to be detachable therefrom.

The coil antenna 360 may be provided in a circularly wound form, but is not limited thereto, and may be provided in various forms such as an ellipse or a polygon having curvatures at the corners thereof. The coil antenna 360 may be positioned so as to cover at least a portion of the internal back housing 350 and the battery 340, and may be connected to the PCB 330 through an opening of the internal back housing 350 so as to establish an electrical connection with a control circuit provided on the PCB 330. The internal back housing 350 and the external back housing 370 may have portions having different heights or thicknesses from the peripheral portions thereof in order to dispose the coil therein.

Figure 4:
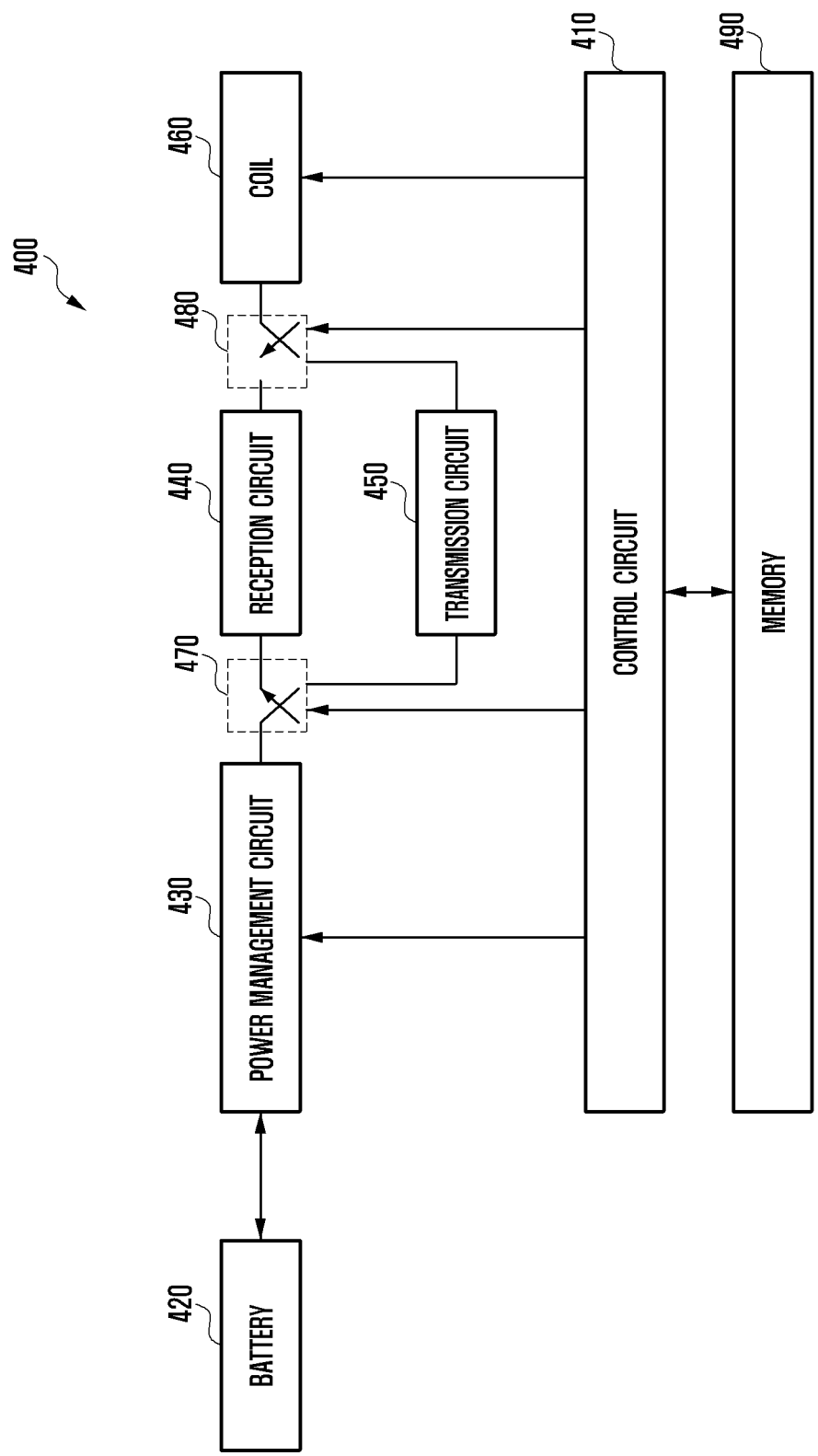
FIG. 4 illustrates a block diagram of an electronic device according to various embodiments of the disclosure.

FIG. 4 illustrates a block diagram of an electronic device in accordance with various embodiments of the disclosure.

As shown in the drawing, an electronic device 400 according to various embodiments of the disclosure may include a control circuit 410, a battery 420, a power management circuit 430, a reception circuit 440, a transmission circuit 450, a coil 460, a first switch 470, a second switch 480, and a memory 490, and even if at least some of the illustrated elements are omitted or substituted, various embodiments of the disclosure can be implemented. The electronic device 400 may include at least some of the elements of the electronic device 101 in FIG. 1, the electronic device 201 in FIG. 2, and/or the electronic device 300 in FIG. 3.

The electronic device 400 may accommodate and support various elements of the electronic device 400, such as a display (not shown), a communication circuit (not shown), and the like, as well as the elements shown in FIG. 4, inside the housing. The housing may include at least one of the external front housing 310, the internal front housing 320, the internal back housing 350, and the external back housing 370 shown in FIG. 3.

The control circuit 410 may be configured to perform calculations or data processing in relation to control and/or communication of the respective elements of the electronic device 400, and may include at least some of the configurations of the processor 120 in FIG. 1 and/or the application processor 210 in FIG. 2. The control circuit 410 may be electrically connected to various elements of the electronic device 400 such as the power management circuit 430, the reception circuit 440, the transmission circuit 450, the coil 460, the first switch 470, the second switch 480, the memory 490, and the like.

Although calculating and data processing functions that can be implemented by the control circuit 410 of the electronic device 400 are not limited, the following description will be made of an embodiment in which the control circuit 410 establishes electrical connections between the elements of the electronic device 400 depending on the power mode state and processes commands related to the power mode state.

The memory 490 may include existing volatile and nonvolatile memories, and is not limited to a specific implementation. The memory 490 may be electrically connected to the control circuit 410, and may store various instructions that can be executed by the control circuit 410. The instructions may include control commands, such as arithmetic and logic calculations, data movement, input/output, and the like, which can be recognized by the control circuit 410. Operations of the control circuit 410, which will be described later, may be performed by loading instructions stored in the memory 490.

The battery 420 may include at least one existing rechargeable battery, and may be embedded in the electronic device 400, or may be configured to be detachable and exchangeable with respect to the electronic device 400.

The power management circuit 430 may include a power management integrated circuit (PMIC), which is an integrated circuit for managing power in the electronic device 400. The power management circuit 430 may execute a function of distributing the power charged in the battery 420 to the respective elements of the electronic device 400 and converting the same to an appropriate level so as to conform to the system of the electronic device 400 and a function of managing power to be charged in the battery 420. The power management circuit 430 may include at least some of the configuration of the power management module 295 shown in FIG. 2.

When the power mode state of the electronic device 400 is in a reception mode, the power management circuit 430 may perform a function of receiving, from the reception circuit 440, the power supplied from an external power supply to thus charge the battery 420. When the power mode state of the electronic device 400 is in a transmission mode, the power management circuit 430 may perform a function of transmitting the power of the battery 420 to the transmission circuit 450.

According to various embodiments, the electronic device 400 has a wireless charging function, and may operate in the power reception mode or in the power transmission mode depending on the power mode state. The electronic device 400 may provide a display (not shown) with a menu that allows a user to switch the power mode state.

The electronic device 400 may include the reception circuit 440 used for receiving power from an external device (e.g., a charging device or another electronic device) in the power reception mode and the transmission circuit 450 used for transmitting power to an external device (e.g., another electronic device) in the transmission mode. Hereinafter, the reception circuit 440 and the transmission circuit 450 may be defined as a first circuit and a second circuit, respectively.

The reception circuit 440 (or the first circuit) may be provided inside the housing, and may provide the power management circuit 430 with the power received from the outside of the housing through the coil 460, and the transmission circuit 450 (or the second circuit) may be provided inside the housing, and may wirelessly provide the power of the battery 420 to the outside of the housing through the coil 460.

The reception circuit 440 and the transmission circuit 450 may be configured by existing circuits required for reception and transmission of wireless charging.

The reception circuit 440 may include, for example, a matching circuit, a rectifying circuit, and a regulating circuit. The matching circuit may perform impedance matching to adjust the impedance viewed from the matching circuit, thereby increasing the efficiency. The rectifying circuit may rectify wireless power received from the coil 460, and the regulating circuit may convert the rectified power to a predetermined gain. The internal configurations included in the reception circuit 440 are not limited thereto, and the reception circuit 440 may include additional configurations included in a reception circuit of an existing wireless charging system.

The transmission circuit 450 may include a matching circuit and a power generation circuit. The matching circuit may perform impedance matching, and the power generation circuit may output DC power having a predetermined level. The power generation circuit may include a full bridge and an oscillator. The internal configurations included in the transmission circuit 450 are not limited thereto, and the transmission circuit 450 may include additional configurations included in a transmission circuit of an existing wireless charging system.

As shown in FIG. 4, the electronic device 400 may include a first switch 470 for switching a connection between the power management circuit 430 and one of either the first circuit or the second circuit, and a second switch 480 for switching a connection between the coil 460 and one of either the first circuit or the second circuit.

The control circuit 410 may recognize the power mode state, and when the power mode state is in the reception mode, may perform switching such that the first switch 470 electrically connects the power management circuit 430 with the reception circuit 440 and such that the second switch 480 electrically connects the reception circuit 440 with the coil 460. In addition, when the power mode state is in the transmission mode, the control circuit 410 may perform switching such that the first switch 470 electrically connects the power management circuit 430 with the transmission circuit 450 and such that the second switch 480 electrically connects the transmission circuit 450 with the coil 460. According to various embodiments, the first switch 470 and the second switch 480 may include an existing semiconductor device that performs a switching function.

The control circuit 410 may include a pin that can inform the switch of the information stating that the power mode state has been changed from the reception mode to the transmission mode. The pin may include a pull-down resistor to maintain the connection of one path of the switch in the off state or in the sleep state of the electronic device 400. In general, since the electronic device 400 is often used in the reception mode when it is in the off state or sleep state, the first switch 470 and the second switch 480 may be designed so as to maintain an electrical connection of the reception mode in the off state or sleep state.

According to various embodiments, the electronic device 400 may include a coil 460 that functions as an antenna in the reception and transmission modes. For example, according to a magnetic induction method, the coil 460 may receive or transmit power from or to a coil of a nearby external device (e.g., a charging device or another electronic device) by electromagnetic induction.

For example, when a magnetic field is generated in the primary coil of an external device (e.g., a charging device or another electronic device) in the reception mode, a current may flow through the coil 460 of the electronic device 400, as a secondary coil, by electromagnetic induction, thereby charging the battery 420 using the same. For example, when a current flows through the coil 460 by means of the power supplied from the battery 420 in the transmission mode, the coil 460, as a primary coil, may generate a magnetic field, and thus a current may flow through the secondary coil of an adjacent external device, thereby charging the battery of the external device.

An important factor that indicates the performance of wireless power transmission is efficiency. In general, the efficiency is related to the turn ratio between the primary coil and the secondary coil in the wireless charging system. If the number of turns of the primary coil on the wireless power transmission side is less than the number of turns of the secondary coil on the reception side, the system may have better efficiency. According to this principle, in the wireless charging system according to the WPC (Wireless Power Consortium) standard, an inductance of 6.3 µH is recommended for the coil on the transmission side, and, in this case, the coil on the reception side may have the maximum efficiency at an inductance of 11 µH, which is higher than that. That is, high efficiency can be obtained using the low inductance of the transmission-side coil and the high inductance of the reception-side coil.

It is inefficient to dispose two or more coils in the electronic device due to problems such as the area occupied by the coils and interference thereof. Thus, the electronic device generally has a single coil that is used in both the reception mode and the transmission mode.

As described above, when the electronic device supports both the reception mode and the transmission mode, since a system using a single coil having a fixed number of turns has the same inductance, it is not easy to configure such that the system has a good efficiency in both the reception mode and the transmission mode.

Accordingly, there is a problem in which the efficiency of one of the reception mode or the transmission mode must be further considered than the other thereof. In general, since the reception mode for charging the battery of the electronic device is more frequently used, the conventional coil was designed to have an inductance value suitable for the reception mode state or an intermediate value between the inductance values of the reception mode and the transmission mode. In this case, even if the efficiency is high in the reception mode, the efficiency in the transmission mode may be low.

Actually, a testing showed that, in the case of using a coil having an inductance of 8.8 µH in the transmission mode, the efficiency was less than 50%, and that when the inductance of the coil was lowered to 8.1 µH, 6.9 µH, and 6.5 µH, the efficiency is increased to 61%, 66%, and 71%, respectively. That is, the lower the inductance of the coil, the higher the efficiency.

When the transmission-side coil and the reception-side coil have the same resonance frequency in a wireless charging system, energy can be transferred at the minimum loss. The result of an actual test showed that the maximum frequency of the transmission-side coil did not exceed 100 kHz when the transmission-side coil and the reception-side coil have the same inductance. Since the WPC system uses a frequency between 100 kHz and 205 kHz, the transmission-side coil must also have a frequency close to 200 kHz in order to obtain the maximum efficiency. It was confirmed that the system has an optimal range when the transmission-side coil has an inductance of 6.5 µH.

Accordingly, the electronic device 400 according to various embodiments of the disclosure may include a configuration in which the inductance of one coil 460 can be changed depending on the power mode state.

According to various embodiments, the coil 460 may include two or more signal connection points. Here, the two or more signal connection points may refer to feeding points. The following description will be made of an example in which a connection is selectively established with any one of the two feeding points in the coil 460, but it is also possible to configure such that any one of three or more feeding points is connected. An example in which the coil 460 has two or more feeding points will be described in more detail with reference to FIG. 7.

According to various embodiments, the electronic device 400 may include a third circuit configured to selectively establish a first electrical connection between the reception circuit 440 (or a first circuit) and a first feeding point of the coil 460 and/or a second electrical connection between the transmission circuit 450 (or a second circuit) and a second feeding point of the coil 460. Here, the first feeding point and the second feeding point may be different from each other. The third circuit may include a control circuit 410 that recognizes the power mode state of the electronic device 400.

According to various embodiments, the control circuit 410 may perform control such that the first electrical connection is established when the power mode state is in the reception mode, wherein a relatively long part of the coil 460 may be used. The control circuit 410 may perform control such that the second electrical connection is established when the power mode state is in the transmission mode, wherein a relatively short part of the coil 460 may be used. The electronic device 400 may include a third switch configured to selectively establish one of either the first electrical connection or the second electrical connection.

The coil 460 may have the same wire width and material. In addition, using the long part of the coil 460 may mean that the wire through which a current flows is long and the number of turns of the coil 460 is large, and using the short part of the coil 460 may mean that the wire through which a current flows is short and the number of turns of the coil 460 is relatively small. In addition, the small number of turns of the coil 460 may mean that the inductance has a relatively small value. According to an embodiment, at least some of the wire width and material of the coil may vary based on the first feeding point and/or the second feeding point.

That is, the third circuit may perform switching such that the coil 460 has a high inductance in the reception mode of the electronic device 400 and has a low inductance in the transmission mode thereof. As described above, if the inductance of the coil 460 is high in the reception mode, and if the inductance of the coil 460 is low in the transmission mode in the wireless charging system, the system may have high efficiency. The electronic device 400 according to various embodiments of the disclosure may have high efficiency in both the reception mode and the transmission mode by adjusting the inductance value of a single coil 460.

Figure 5A:
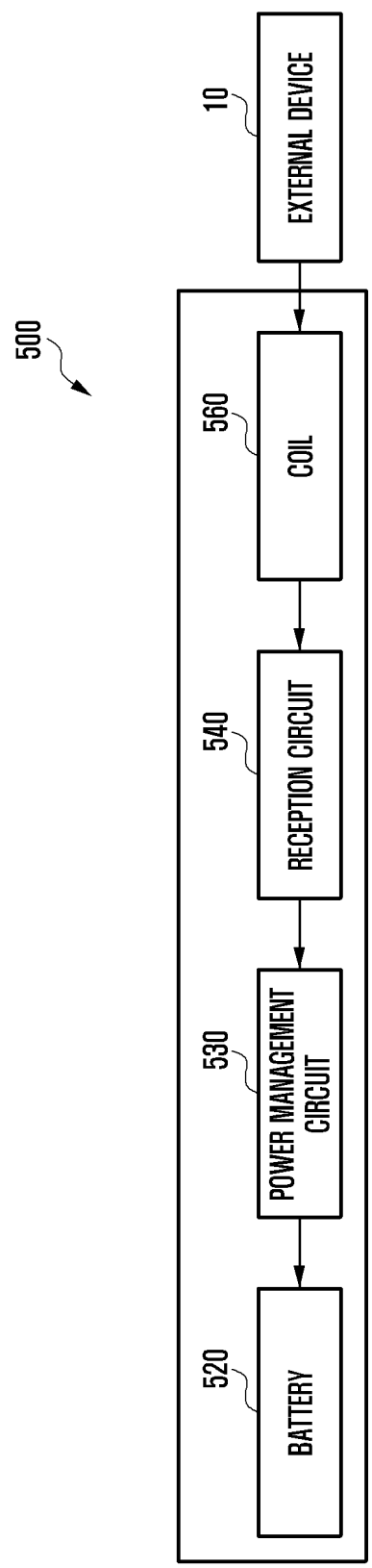
FIGS. 5A and 5B illustrate electrical connections in a reception mode and in a transmission mode, respectively, according to various embodiments of the disclosure.
Figure 5B:
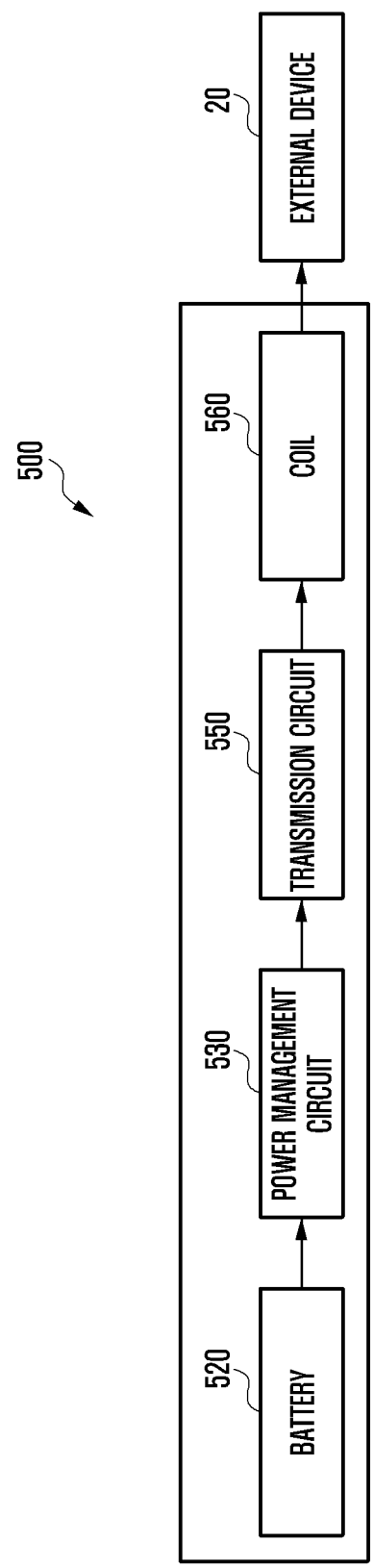

FIGS. 5A and 5B illustrate electrical connections in the reception mode and in the transmission mode in accordance with various embodiments of the disclosure.

The control circuit (e.g., the control circuit 410 in FIG. 4) may perform control so as to establish an electrical connection as shown in FIG. 5A when the power mode state of the electronic device 500 is in the reception mode. Thus, the first switch may be switched so as to electrically connect the power management circuit 530 with the reception circuit 540, and the second switch may be switched to electrically connect the reception circuit 540 with the coil 560. In addition, the third switch may be switched such that the first feeding point of the coil 560 is electrically connected to the reception circuit 540. Here, at least some of the first switch, the second switch, and the third switch may be simultaneously switched.

According to various embodiments, the electronic device may be configured to establish the first electrical connection in the reception mode as shown in FIG. 5A while the electronic device 500 is in the off state or while the control circuit is in the off state. That is, the first switch may establish an electrical connection between the power management circuit and the reception circuit and the second switch may establish an electrical connection between the coil and the reception circuit while the control circuit is in the off state. To this end, the control circuit of the electronic device may be connected to a pull-down resistor that maintains the connection of one path of the switch in the reception mode. This is due to the fact that, when the electronic device 500 is in the off state, the electronic device 500 is more likely to be used to charge the battery thereof, instead of transmitting power to the external device.

According to various embodiments, the control circuit may be configured to determine that the power mode state is in the reception mode and to establish the first electrical connection in the reception mode when a current is applied to the coil 560. This corresponds to the operation in which a magnetic field is generated around the coil 560 of the electronic device 500 by means of the magnetic field of the external device, and thus a current is generated in the coil 560, which may be determine to be in the state of receiving power.

According to various embodiments, the reception circuit 540 may be configured to change the internal impedance. To this end, the reception circuit 540 may include at least one varactor capable of changing at least one capacitance value therein.

The resonance frequency of the external device 10 or 20 is required to match the resonance frequency of the coil 560 of the electronic device 400 in order to increase the wireless charging efficiency. Accordingly, the capacitance value of the varactor of the reception circuit 540 may be changed for resonant frequency matching depending on the inductance of the coil 560 in the reception mode.

As described above, when the external device 10 (e.g., an external charging device or another electronic device set in the transmission mode), which provides power in the state in which the electrical connection is established according to the reception mode, is located close to the electronic device 500, the coil 560 of the electronic device 500 may receive power through electromagnetic induction by means of the magnetic field generated in the coil of the external device. The received power may be transmitted to the reception circuit 540 via the coil 560, and the reception circuit 540 may transmit the same to the power management circuit 530 after performing the processes of matching, rectification, adjustment, and the like.

The power management circuit 530 may charge the battery 520 using at least some of the received power, and may supply the remaining power to respective elements of the electronic device 500.

The control circuit (e.g., the control circuit 410 in FIG. 4) may perform control so as to establish the second electrical connection as shown in FIG. 5B when the power mode state of the electronic device 500 is in the transmission mode. Accordingly, the first switch may be switched such that the power management circuit 530 is electrically connected to the transmission circuit 550, and the second switch may be switched such that the transmission circuit 550 is electrically connected to the coil 560. In addition, the third switch may be switched such that the second feeding point of the coil 560 and the transmission circuit 550 are electrically connected to each other.

According to various embodiments, the control circuit may be configured to switch the power mode state to the transmission mode so as to establish a second electrical connection when changing the power mode state from the reception mode to the transmission mode according to a user input. According to another embodiment, when a request for power transmission is received from an external electronic device, the control circuit may change the power mode state to the transmission mode even without a user input. According to various embodiments, like the reception circuit 540, the transmission circuit 550 may be configured to change the internal impedance. To this end, the transmission circuit 550 may include at least one varactor capable of changing at least one capacitance value therein. According to various embodiments, the capacitance value of the varactor of the reception circuit 540 may be changed for resonance frequency matching according to the inductance of the coil 560, which has been changed in the transmission mode.

As described above, when the external device (e.g., another electronic device) 20 is located close to the electronic device 500 in the state in which an electrical connection is established according to the transmission mode, the power management circuit 530 may transmit the power of the battery 520 to the transmission circuit 550. The power output from the transmission circuit 550 is transmitted to the coil 560, so that a magnetic field may be generated around the coil 560 according to the current flow of the coil 560. Thereby, power may be supplied to the coil of the adjacent external device 20 by means of electromagnetic induction.

Figure 6:
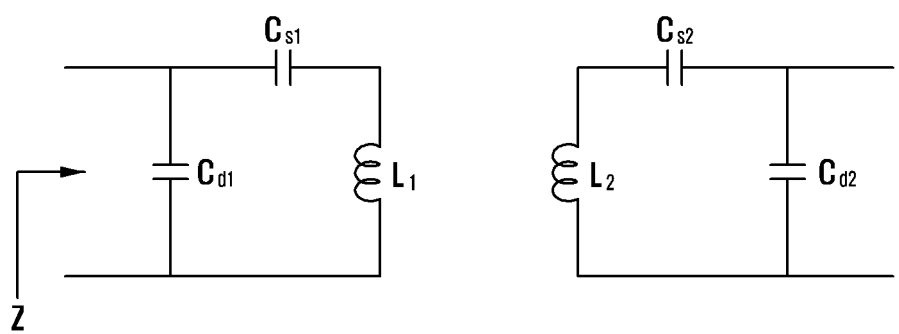
FIG. 6 schematically illustrates an equivalent circuit of an electronic device and an external device according to various embodiments of the disclosure.

FIG. 6 schematically illustrates an equivalent circuit of an electronic device and an external device according to various embodiments of the disclosure.

According to an embodiment, an equivalent circuit viewed from the coil L1 of the electronic device may include Cs1, which is connected in series with the coil L1, and Cd1 that is connected in parallel with the same. In addition, an equivalent circuit viewed from the coil L2 of the external device may include Cs2, which is connected in series with the coil L2, and Cd2 that is connected in parallel with the same.

According to various embodiments, L1 may vary depending on the power mode state. For example, the electronic device may set L1 to 7.0 to 11.0 µH when the power mode state is in the reception mode, and may set L1 to 7.0 to 5.0 µH, which is lower than that of the reception mode, when the power mode state is in the transmission mode. Here, the inductance value may vary depending on the switching of the third switch as described above.

According to an embodiment, the electronic device may change Cs1 and Cd1 for resonance frequency matching with an external device. For example, the reception circuit and the transmission circuit may include at least one varactor capable of varying the capacitance value, and Cs1 and Cd1 may vary according to the operation of the varactor. The electronic device may perform control such that the capacitance value varies depending on the L1 value and the L2, Cs2, and Cd2 values of the external device.

Figure 7:
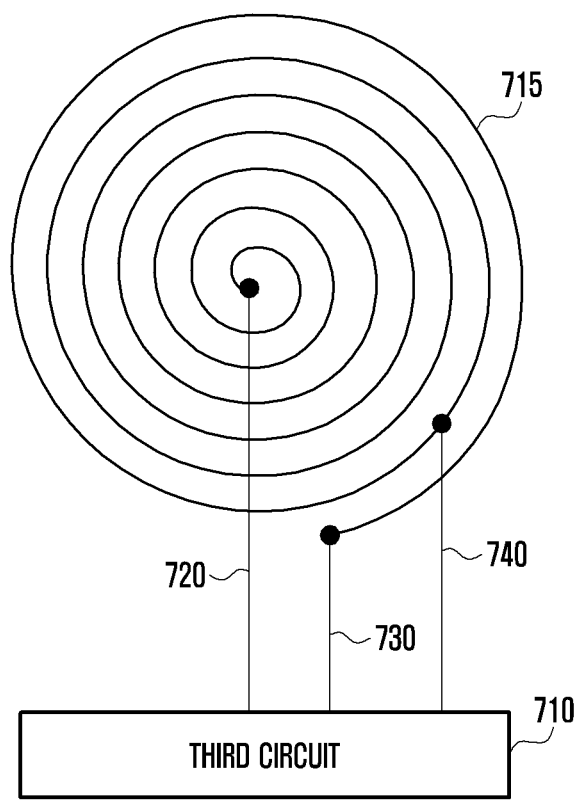
FIG. 7 illustrates a connection structure of a coil according to various embodiments of the disclosure.

FIG. 7 illustrates a connection structure of a coil 715 according to various embodiments of the disclosure.

An electronic device, according to various embodiments of the disclosure, may use a single coil 715 for both the reception mode and the transmission mode, and may vary the inductance value of the coil 715 depending on the power mode state.

According to various embodiments, the coil 715 may be configured in the form of a circularly wound wire, and one end 720 of the coil 715, which is located at the center thereof, may be coupled to a third circuit 710. A first feeding point 730 is formed at the outermost end of the coil 715 so as to be connected with the third circuit 710. In addition, a second feeding point 740 may be formed at the pattern of the wire, which is located inwards from the first feeding point 730. For example, the total number of turns of the coil 715 in the case where the first feeding point 730 is connected may be 6, and the second feeding point 740 may be formed at the position where the number of turns of the coil 715 is reduced by 1 turn corresponding to the outermost pattern thereof.

According to an embodiment, the third circuit 710 may establish an electrical connection with one of either the first feeding point 730 or the second feeding point 740 through the third switch. For example, the inductance of the coil 715 may have a value (e.g., 8.2 µH) in the range of 7.0 µH to 11.0 µH when the coil is connected at the first feeding point 730, and the inductance of the coil 715 may have a value (e.g., 6.6 µH) in the range of 5.0 µH to 7.0 µH, which is lower than the above value, when the coil is connected at the second feeding point 740.

The electronic device may establish an electrical connection between the first feeding point 730 of the coil 715 and the reception circuit in the reception mode, and may establish an electrical connection between the second feeding point 740 of the coil 715 and the transmission circuit in the transmission mode. Accordingly, in the reception mode, a longer part of the coil 715 may be used, the number of turns of the coil 715 may be larger, and the inductance value may be higher, compared to the transmission mode.

Although the description has been made of an example in which two feeding points (or coil connection points) can be selectively connected in FIG. 7, an electronic device according to various embodiments of the disclosure may be configured to selectively connect one of three or more feeding points.

In addition to the illustrated method, various techniques of changing the inductance of the coil 715 itself may be applied.

Although FIG. 7 shows that the coil 715 has two feeding points 730 and 740, according to various embodiments, the coil 715 may have three or more feeding points and the inductance value of the coil 715 may be adjusted stepwise. According to various embodiments, the electronic device may receive information on the external electronic device (e.g., the type of external electronic device, the coil size and inductance, required amount of power, and the like) in the transmit mode or in the reception mode, and may determine the required inductance value of the coil 715 according to the received information, thereby establishing a connection of one of a plurality of feeding points.

An electronic device according to various embodiments of the disclosure may include: a housing having a first surface; a conductive coil located close to the first surface inside the housing; a rechargeable battery located inside the housing; a first circuit located inside the housing and providing a power management circuit with power wirelessly received from the outside of the housing through the coil; a second circuit located inside the housing and wirelessly providing power of the battery to the outside of the housing through the coil; and a third circuit configured to selectively establish a first electrical connection between the first circuit and a first feeding point of the coil or a second electrical connection between the second circuit and a second feeding point of the coil, wherein the first feeding point and the second feeding point may be different.

According to various embodiments, the third circuit may be configured to recognize a power mode state of the electronic device and to control a first switch so as to establish the first electrical connection when the power mode state is in the reception mode and so as to establish the second electrical connection when the power mode state is in the transmission mode.

According to various embodiments, the third circuit may be configured to control the third switch so as to use a long part of the coil when the power mode state is in the reception mode and so as to use a short part of the coil when the power mode state is in the transmission mode.

According to various embodiments, the coil may have a larger number of turns when the first electrical connection is established than when the second electrical connection is established.

According to various embodiments, the coil may have a greater inductance when the first electrical connection is established than when the second electrical connection is established.

According to various embodiments, the inductance of the coil may have any value in the range of 7.0 to 11.0 µH when the first electrical connection is established, and may have any value in the range of 5.0 to 7.0 µH when the second electrical connection is established.

According to various embodiments, the electronic device may further include: a second switch for switching a connection between the power management circuit and one of either the first circuit or the second circuit; and a third switch for switching a connection between the coil and one of either the first circuit or the second circuit, wherein the third circuit may be configured to control switching of the second switch and the third switch depending on the recognized power mode state.

According to various embodiments, when the third circuit is in the off state, the second switch may establish a connection between the power management circuit and the first circuit, and the third switch may establish a connection between the coil and the first circuit.

According to various embodiments, the third circuit may be configured to determine that the power mode state is in the reception mode when a current is applied to the coil, thereby establishing the first electrical connection.

According to various embodiments, the third circuit may be configured to determine that the power mode state is in the transmission mode when a power transmission request is received from an external electronic device, thereby establishing the second electrical connection.

According to various embodiments, the first circuit and the second circuit may be configured to change internal impedance depending on the power mode state.

An electronic device according to various embodiments of the disclosure may include: a coil disposed inside the electronic device so as to include two or more signal connection points; a first circuit configured to wirelessly transmit power to an external electronic device through the coil; a second circuit configured to receive power from an external electronic device through the coil; a control circuit; and a memory electrically connected to the control circuit, wherein the memory may include instructions that, when executed, allow the control circuit to recognize a power mode state of the electronic device and to control the signal connection points of the coil depending on the power mode state.

According to various embodiments, the coil may include a switch for connecting any one of the two or more signal connection points.

According to various embodiments, the control circuit may control the switch such that any one of the two or more signal connection points is connected depending on the power mode state.

According to various embodiments, the control circuit may control the switch such that a longer part of the coil is used when the power mode state is in the reception mode than when the power mode state is in the transmission mode.

According to various embodiments, the control circuit may perform control such that the inductance of the coil is greater when the power mode state is in the reception mode than that when the power mode state is in the transmission mode.

Figure 8:
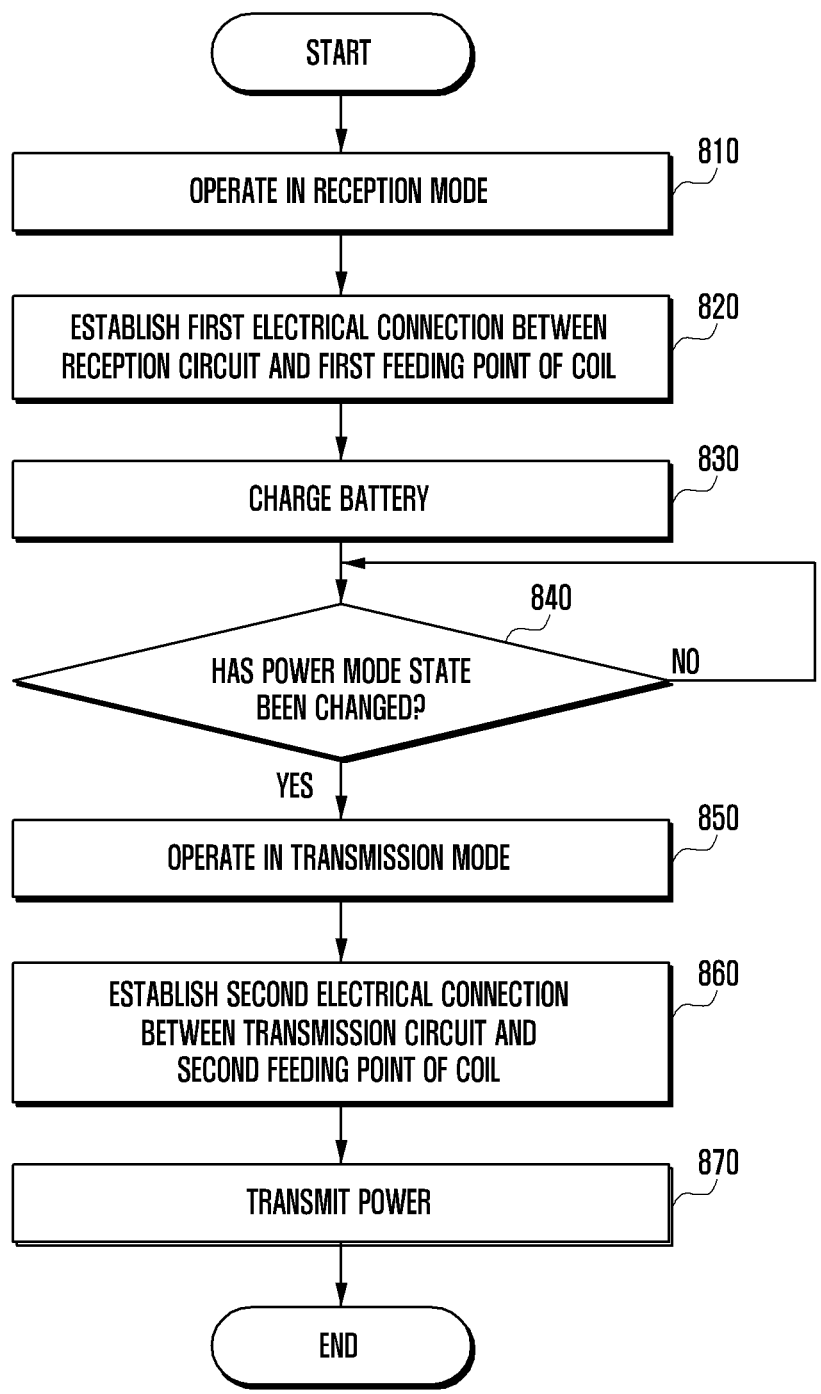
FIG. 8 is a flowchart of a wireless power transmission and reception control method of an electronic device according to various embodiments of the disclosure.

FIG. 8 is a flowchart showing a wireless power transmission and reception control method of an electronic device according to various embodiments of the disclosure.

The illustrated method may be performed by the electronic device described above with reference to FIGS. 1 to 7, and the description of at least some of the technical features, which have already been described above, will be omitted below.

The electronic device may include a coil, a reception circuit (or a first circuit) for providing the power received from an external device through the coil to a power management circuit, and a transmission circuit (a second circuit) for wirelessly providing the power of the battery to an external device through the coil.

The electronic device may recognize the power mode state, and may operate in the reception mode in operation 810. In general, since the electronic device is often used in the reception mode rather than the transmission mode, the reception mode may be set as a default. In addition, the electronic device may be configured to be forcibly switched to the reception mode when the electronic device is in the off state. To this end, the control circuit of the electronic device may be connected to a pull-down resistor for maintaining the connection of one path of the switch in the reception mode state.

In operation 820, the electronic device may establish a first electrical connection between the reception circuit and the first feeding point of the coil. The electronic device, at the same time as operation 820, may perform switching such that the first switch electrically connects the power management circuit with the reception circuit and such that the second switch electrically connects the reception circuit with the coil.

In operation 830, the electronic device may charge the battery using the power received from an external device (e.g., an external charging device or another electronic device). The electrical connection inside the electronic device in the reception mode may be the same as described above with reference to FIG. 5*a*.

In operation 840, the electronic device may determine whether or not the power mode state has been changed. The electronic device may display a menu for changing the power mode state from the reception mode to the transmission mode or vice versa, and may change the charging mode according to the user's selection.

In operation 850, the electronic device may change the power mode state to the transmission mode according to a user input, and may operate in the transmission mode. According to another embodiment, when a request for power transmission is received from an external electronic device, the electronic device may change the power mode state to the transmission mode even without a user input.

In operation 860, the electronic device may establish a second electrical connection between the transmission circuit and the second feeding point of the coil. The electronic device, at the same time as operation 860, may perform switching such that the first switch electrically connects the power management circuit with the transmission circuit and the second switch electrically connects the transmission circuit with the coil.

In operation 870, the electronic device may transmit the power of the battery to an external device (e.g., another electronic device). The electrical connection inside the electronic device in the transmission mode may be the same as described above with reference to FIG. 5B.

Although FIG. 8 illustrates an embodiment in which the electronic device is switched to the transmission mode while the electronic device is operating in the reception mode, the electronic device may be switched from the transmission mode to the reception mode according to the setting of the electronic device. That is, the electronic device may perform operations 850 to 870 first, and may then perform operations 810 to 830.

A wireless power transmission and reception control method of an electronic device including a coil for receiving and transmitting power, according to various embodiments of the disclosure, may include: recognizing a power mode state of the electronic device; establishing a first electrical connection between a first circuit for receiving wireless power from an external electronic device and a first feeding point of the coil when the power mode state is in a reception mode; and establishing a second electrical connection between a second circuit for transmitting wireless power to an external electronic device and a second feeding point of the coil when the power mode state is in a transmission mode.

According to various embodiments, a longer part of the coil may be used when establishing the second electrical connection than when establishing the first electrical connection.

According to various embodiments, the inductance of the coil when establishing the second electrical connection is lower than that when establishing the first electrical connection.

According to various embodiments, the recognizing of the power mode state of the electronic device may include: determining that the power mode state is in the reception mode when a current is applied to the coil; and determining that the power mode state is in the transmission mode when a power transmission request is received from an external electronic device.

The invention claimed is:

1. An electronic device comprising:
a housing having a first surface;
a conductive coil located close to the first surface inside the housing;
a rechargeable battery located inside the housing;
a first circuit located inside the housing and providing a power management circuit with power wirelessly received from the outside of the housing through the coil;
a second circuit located inside the housing and wirelessly providing power of the battery to the outside of the housing through the coil; and
a third circuit configured to:
establish a first electrical connection between the first circuit and a first feeding point of the coil when a power mode state of the electronic device is in a reception mode; or
establish a second electrical connection between the second circuit and a second feeding point, different from the first feeding point, of the coil, when the power mode state of the electronic device is in a transmission mode, wherein the coil has a greater inductance when the first electrical connection is established in the reception mode than when the second electrical connection is established in the transmission mode, and wherein when the electronic device is in an off state, the power management circuit and the first circuit are electrically connected and the first circuit and the first feeding point of the coil are electrically connected.

2. The electronic device of claim 1, wherein the third circuit is configured to recognize the power mode state of the electronic device and to control a first switch to establish the first electrical connection when the power mode state is in the reception mode or to establish the second electrical connection when the power mode state is in the transmission mode.

3. The electronic device of claim 1, wherein the third circuit is configured to control a third switch so as to use a long part of the coil when the power mode state is in the reception mode and so as to use a short part of the coil when the power mode state is in the transmission mode.

4. The electronic device of claim 1, wherein the coil has a larger number of turns when the first electrical connection is established than when the second electrical connection is established.

5. The electronic device of claim 1, wherein the inductance of the coil has any value in the range of 7.0 to 11.0 µH when the first electrical connection is established and has any value in the range of 5.0 to 7.0 µH when the second electrical connection is established.

6. The electronic device of claim 1, further comprising:
a second switch for switching a connection between the power management circuit and one of either the first circuit or the second circuit; and
a third switch for switching a connection between the coil and one of either the first circuit or the second circuit,
wherein the third circuit is configured to control switching of the second switch and the third switch depending on a recognized power mode state.

7. The electronic device of claim 1, wherein the third circuit is configured to determine that the power mode state is in the reception mode when a current is applied to the coil, thereby establishing the first electrical connection.

8. The electronic device of claim 1, wherein the third circuit is configured to determine that the power mode state is in the transmission mode when a power transmission request is received from an external electronic device, thereby establishing the second electrical connection.

9. The electronic device of claim 1, the first circuit and the second circuit is configured to change internal impedance depending on the power mode state.

10. An electronic device comprising:
a coil disposed inside the electronic device and comprising a first signal connection point and a second signal connection point;
a first circuit configured to wirelessly transmit power to an external electronic device through the coil and connectable with the first signal connection point;
a second circuit configured to receive power from an external electronic device through the coil and connectable with the second signal connection point, the second circuit further configured to provide the received power to a power management circuit;
a control circuit; and
a memory electrically connected to the control circuit,
wherein the memory comprises instructions that, when executed, allow the control circuit to:
recognize a power mode state of the electronic device, the power mode state comprising a reception mode and a transmission mode, and
control the first signal connection point of the coil to connect with the first circuit in the transmission mode and the second signal connection point of the coil to connect with the second circuit in the reception mode, and
wherein the coil has a greater inductance when the coil is connected with the second circuit in the reception mode than when the coil is connected with the first circuit in the transmission mode, and
wherein when the electronic device is in an off state, the power management circuit and the second circuit are electrically connected and the second circuit and a second feeding point of the coil is electrically connected.

11. The electronic device of claim 10, wherein the coil comprises a switch for connecting any one of the first signal connection point and the second signal connection point.

12. The electronic device of claim 10, wherein the control circuit controls a switch such that a longer part of the coil is used when the power mode state is in the reception mode than when the power mode state is in the transmission mode.

13. A wireless power transmission and reception control method of an electronic device comprising a coil for receiving or transmitting power, the method comprising:
recognizing a power mode state of the electronic device, the power mode state comprises a reception mode and a transmission mode;
establishing a first electrical connection between a first circuit for receiving wireless power from an external electronic device and a first feeding point of the coil when the power mode state is in the reception mode; and
establishing a second electrical connection between a second circuit for transmitting wireless power to an external electronic device and a second feeding point of the coil when the power mode state is in the transmission mode,
wherein the coil has a greater inductance when the first electrical connection is established in the reception mode than when the second electrical connection is established in the transmission mode, and
wherein when the electronic device is in an off state, a power management circuit and the first circuit are electrically connected and the first circuit and the first feeding point of the coil is electrically connected.

14. The method of claim 13, wherein a longer part of the coil is used when establishing the second electrical connection than when establishing the first electrical connection.

15. The method of claim 13, wherein the recognizing of the power mode state of the electronic device comprises:
determining that the power mode state is in the reception mode when a current is applied to the coil; and
determining that the power mode state is in the transmission mode when a power transmission request is received from an external electronic device.

* * * * *